United States Patent
Kendra

(10) Patent No.: US 8,783,596 B2
(45) Date of Patent: Jul. 22, 2014

(54) FISHING REEL WITH A 180 DEGREE ROTATING SPOOL

(76) Inventor: Mark Frances Kendra, Great Meadows, NJ (US)

( * ) Notice: Subject to any disclaimer, the term of this patent is extended or adjusted under 35 U.S.C. 154(b) by 165 days.

(21) Appl. No.: 13/606,357

(22) Filed: Sep. 7, 2012

(65) Prior Publication Data

US 2013/0119176 A1 May 16, 2013

Related U.S. Application Data

(60) Provisional application No. 61/573,522, filed on Sep. 8, 2011.

(51) Int. Cl.
*A01K 89/01* (2006.01)
*A01K 89/06* (2006.01)
*A01K 89/015* (2006.01)

(52) U.S. Cl.
CPC .............. *A01K 89/015* (2013.01); *A01K 89/06* (2013.01)
USPC ........................................................ 242/229

(58) Field of Classification Search
CPC .............................. A01K 89/06; A01K 89/015
USPC ........................................................ 242/229
See application file for complete search history.

(56) References Cited

U.S. PATENT DOCUMENTS

| | | | | |
|---|---|---|---|---|
| 2,580,777 A * | 1/1952 | Hewlett | ......................... | 242/229 |
| 2,674,057 A * | 4/1954 | Stewart | ......................... | 242/229 |
| 2,749,057 A * | 6/1956 | Jenkins et al. | ................ | 242/229 |
| 2,941,748 A * | 6/1960 | Matthiesen | .................... | 242/229 |
| 3,004,731 A * | 10/1961 | Mauborgne | .................... | 242/229 |
| 3,039,716 A * | 6/1962 | Visockis | ........................ | 242/229 |
| 3,155,340 A * | 11/1964 | King | ............................. | 242/229 |
| 3,384,320 A * | 5/1968 | Hawk | ............................. | 242/229 |
| 3,498,561 A * | 3/1970 | Smith | ............................ | 242/229 |
| 3,727,857 A * | 4/1973 | Chann | ........................... | 242/229 |
| 3,817,470 A * | 6/1974 | Calhoun | ........................ | 242/229 |
| 3,944,159 A * | 3/1976 | Dobbs | ........................... | 242/229 |
| 4,106,717 A * | 8/1978 | Thiel | ............................. | 242/229 |
| 4,184,651 A * | 1/1980 | McConachy | ................. | 242/229 |
| 4,213,579 A * | 7/1980 | Fox | ............................... | 242/255 |
| 5,595,352 A | 1/1997 | Oh | | |
| 5,873,536 A * | 2/1999 | Beldycki | ....................... | 242/323 |
| 7,568,650 B2 | 8/2009 | Barker | | |
| 8,096,493 B2 | 1/2012 | Bennis | | |
| 2002/0027177 A1 | 3/2002 | Barker | | |
| 2010/0059615 A1* | 3/2010 | Lombardo et al. | ............. | 242/229 |
| 2012/0001007 A1* | 1/2012 | Bloemendaal | ................ | 242/229 |

* cited by examiner

*Primary Examiner* — Emmanuel M Marcelo
(74) *Attorney, Agent, or Firm* — Porzio, Bromberg & Newman, P.C.

(57) ABSTRACT

The present invention provides a fishing reel that allows the caster to cast from either side of the spool or an in-line position. Starting from a spool position with the line on the spool in the same direction as the retrieve referred to as the in-line position, the line can be cast from this position, or the spool can be rotated 90 degrees in either direction from the in-line position for the cast. After the spool is rotated, the cast is discharged from the side of the spool in a direction perpendicular to the line on the spool. After the cast, the spool is returned to the starting position of the in-line position, with the line on the spool in the same direction as the retrieve. The line is then retrieved by turning a handle connected to a series of gears that engage the spool and thereby reel in the line.

15 Claims, 5 Drawing Sheets

FISHING REEL WITH A 180 DEGREE ROTATING SPOOL

CROSS REFERENCE TO RELATED APPLICATION

This application claims the benefit of U.S. Provisional Patent Application No. 61/573,522, filed Sep. 8, 2011, the entirety of which is hereby incorporated by reference into this application.

BACKGROUND OF THE INVENTION

1. Field of the Invention

The present invention relates to the field of fishing reels in general, and more specifically, to a fishing reel having a spool that rotates 180 degrees allowing the caster to cast from either side of the spool or an in-line position.

2. Description of Related Art

Throughout the history of fishing, line twist has always been a disadvantage to fishermen. The unavoidable twisting of the fishing line occurs more dramatically in spinning reels and spin casting reels than it does in bait casting reels. However, even when casting with a bait casting reel, in which case the line comes directly off the spool and is retrieved directly onto the spool, the line will still twist as a result of the lure spinning through the air during the cast or spinning through the water during the retrieve. On spinning and spin casting reels, the line is cast from the side of the spool like a coil being pulled apart causing the line to be twisted in a particular direction.

Over a period of time casting and retrieving the line accumulates more and more twist, because the caster has no method of countering the accumulation of twist in the line. Eventually, this results in backlashes and birds nests and the line becomes unusable. Twisted line also becomes shorter and sacrifices the length of the cast.

It is desirable to provide a fishing reel that allows the caster to untwist the line in an appropriate direction against the direction that the line has twisted, thereby removing the twist.

SUMMARY OF THE INVENTION

The present invention provides a fishing reel that allows the caster to cast from either side of the spool or an in-line position. Starting from a spool position with the line on the spool in the same direction as the retrieve referred to as the in-line position, the line can be cast from this position, or the spool can be rotated 90 degrees in either direction from the in-line position for the cast. After the spool is rotated, the cast is discharged from the side of the spool in a direction perpendicular to the line on the spool. After the cast, the spool is returned to the starting position of the in-line position, with the line on the spool in the same direction as the retrieve. The line is then retrieved by turning a handle connected to a series of gears that engage the spool and thereby reel in the line.

The present invention not only allows the caster to cast from a traditional in-line spool position, or a side-spool position, but allows the caster to cast from either side of the spool. When the first cast is taken from one side of the spool or the other, a number of positive line twists are generated. By casting from the opposite side of the spool on the second cast, a number of negative line twists are generated thus bringing the line twist count back to 0. This invention also allows the caster to cast from the 0 degree in-line spool position and remove line twist that is generated by the lure spinning through the air on the cast or spinning through the water on the retrieve by casting from the appropriate side of the spool to counter the twist of the line.

When line is cast from one side of the spool it twists in the opposite direction as if it were cast from the other side of the spool. The caster can untwist the line and prevent accumulation of twist in the line by casting from the appropriate side to untwist the line. Accordingly, the reel of the present invention can be used by a caster to untwist the line.

The invention will be more fully described by reference to the following drawings.

DETAILED DESCRIPTION

Figure 1:
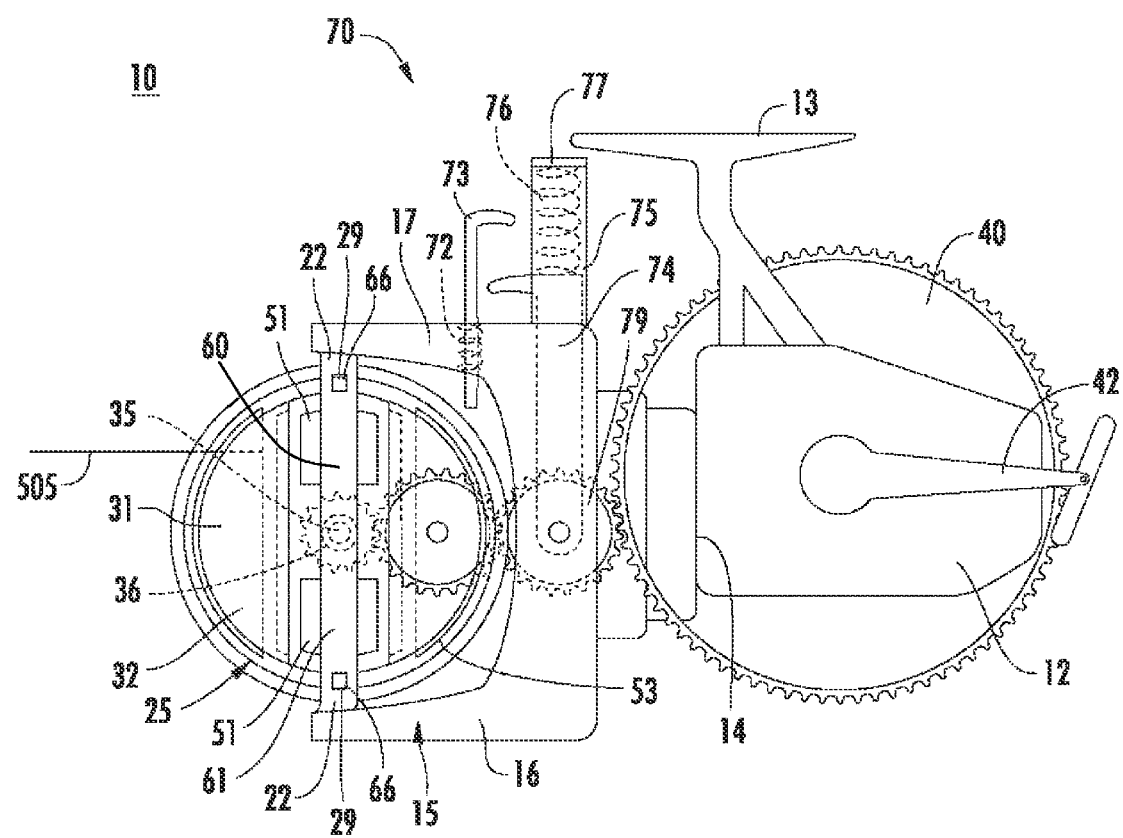
FIG. 1 is a side elevational view of the fishing reel of the present invention showing the spool in the in-line cast and retrieve position parallel to the fishing rod.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
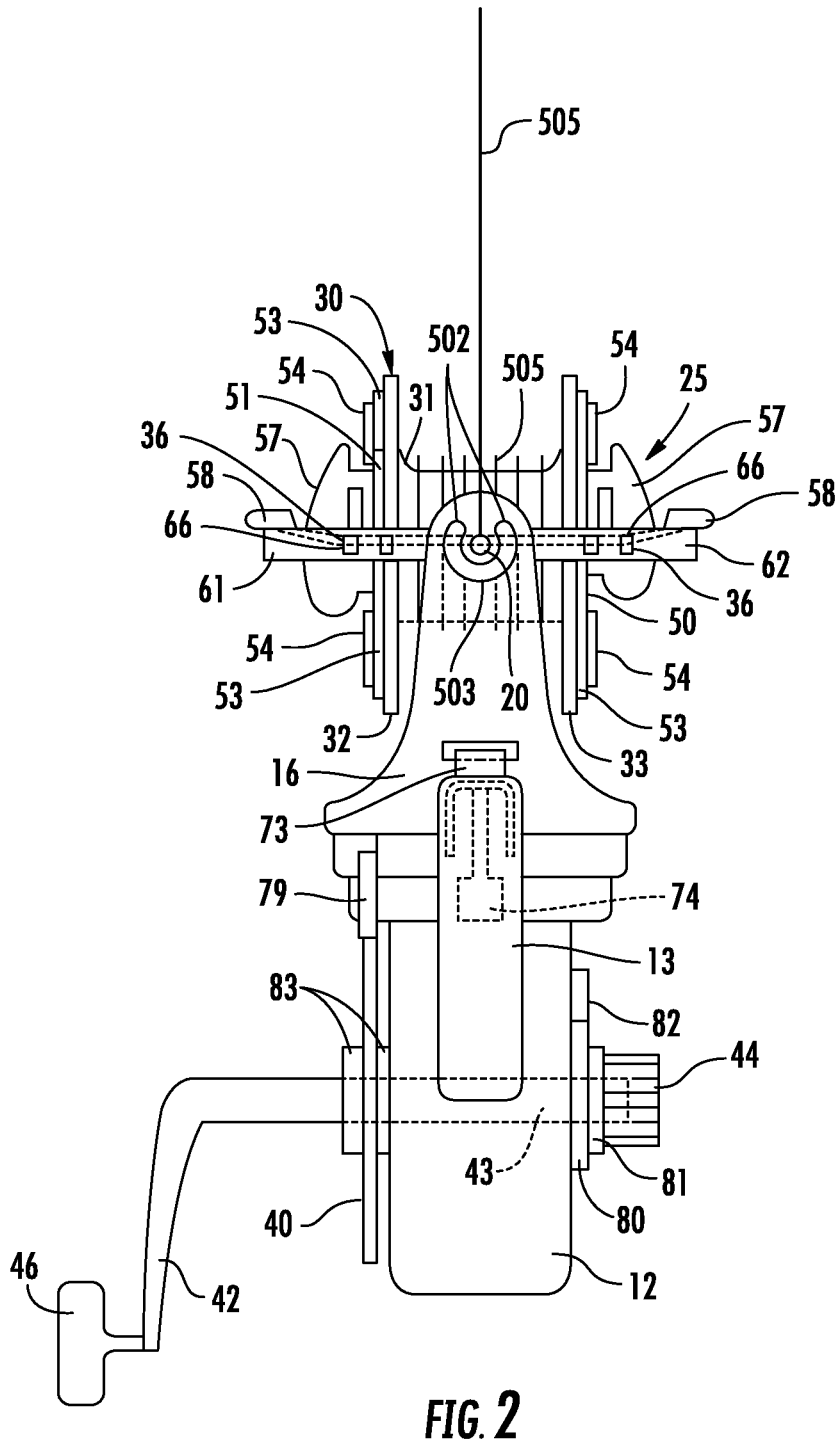
FIG. 2 is a top plan view of the fishing reel shown in FIG. 1 showing the spool in the in-line cast and retrieve position parallel to the fishing rod.
Figure 3:
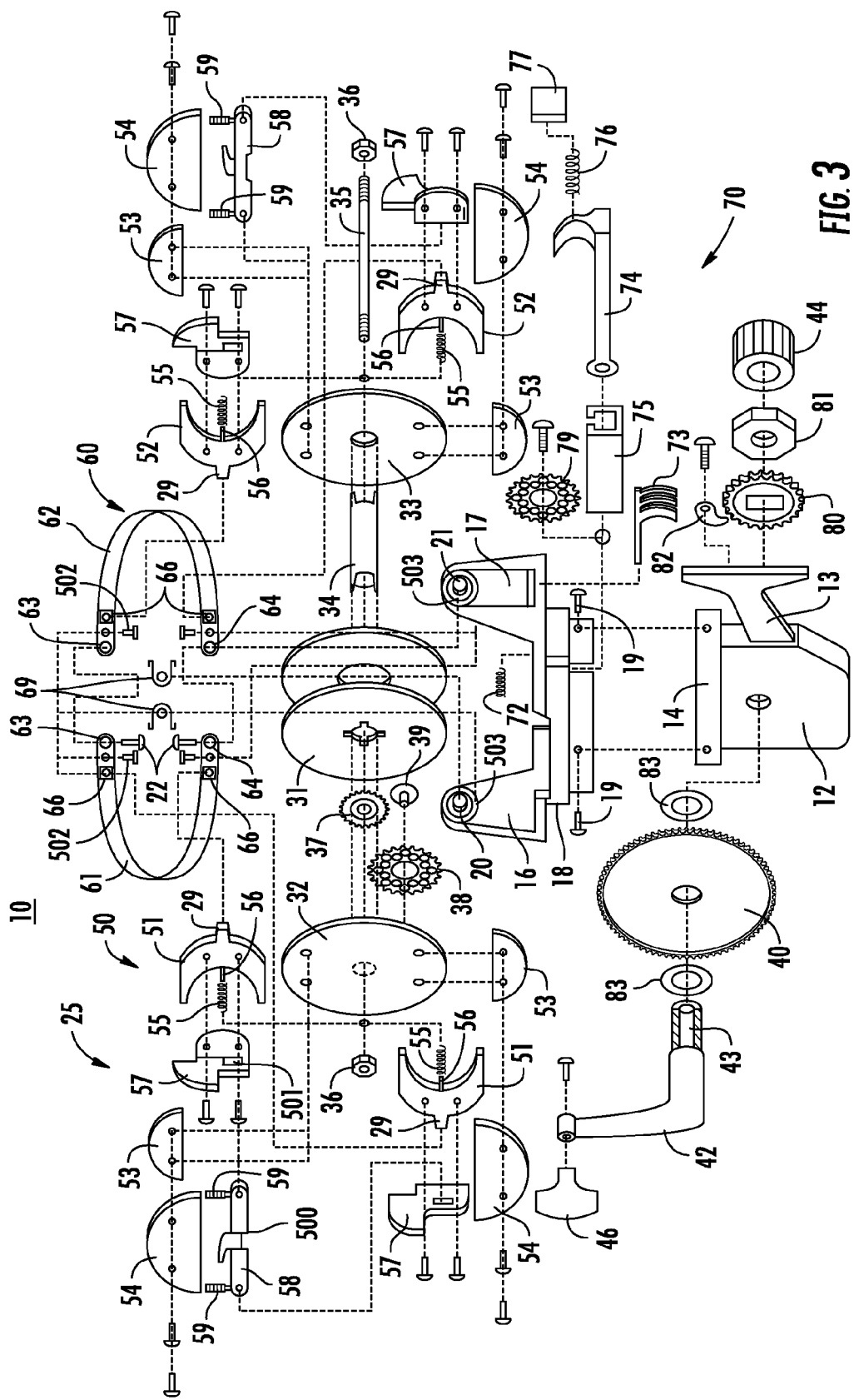
FIG. 3 is disassembled perspective schematic view of the fishing reel shown in FIG. 1.

FIGS. 1-3 illustrate fishing reel 10 in the in-line cast and retrieve position, in accordance with the teachings of the present invention. This position is also referred to as the zero degree position. Reel body 12 is supported by rod-mounting vertical support 13. Rod-mounting vertical support 13 can be attached to a fishing rod (not shown).

Spool support system 15 is positioned at front end 14 of reel body 12. Spool support system 15 comprises brace arm 16 and brace arm 17. Brace arm 16 and brace arm 17 can be coupled to one another with band 18, as shown in FIG. 3. Alternatively, brace arm 16 and brace arm 17 can be integral to one another. Band 18 can be coupled to front end 14 of reel body 12 with screws 19. Spring loaded spool support band 60 comprises left side spool support band 61 and right side spool support band 62. Brace arm 16 and brace arm 17 have respective pivotal point apertures 20, 21 for receiving pivot prongs 22 of spool support bands 61, 62 that can be rotated 90 degrees by disengaging spool sleds 51, 52 from spool support bands 61, 62 on the appropriate side for a 90 degree rotation of spool 31. Sled locking device 58 is engaged with sled tabs 57 on spool assembly 30 for allowing spool 31 to rotate within pivot point apertures 20, 21. Sled locking device 58 can be spring loaded with a biasing means to lock sled locking device 58 to notches 500 of sled tabs 57.

Spool assembly 30 comprises spool discs 32, 33 on each side of spool 31 that serves as a foundation for spool sleds 51, 52 and sled locking device 58 and sled tabs 57. Spool discs 32, 33 are connected to each other by means of spool disc bushing 34 and threaded spool rod 35 that serves as an axis for spool 31. Threaded nuts 36 can be attached at either end of threaded spool rod 35.

Spool gear 37 can be received on spool disc bushing 34 between spool 31 and spool disc 32. For example, spool gear 37 can have a diameter of about 1.47 inches and about 19 teeth. Disc gear 38 can be attached to spool disc 32 with disc gear screw 39. For example, disc gear 38 can include eight ball bearings and have a diameter of about 2.94 inches and 38 teeth. Disc gear 38 engages spool gear 37. Handle gear 40 engages trigger gear 79 when engaging gear trigger 74 is released. Trigger gear 79 is the same size as disc gear 38. Handle 42 attaches handle gear 40 to reel body 12 using flat sided threaded end 43. Flat sided threaded end 43 is received by threaded nut 44, anti-reverse gear 80, drag pressure nut 81 and two drag washers 83 on each side of handle gear 40. Engaging anti-reverse gear 80 is anti-reverse catch lever 82. Handle grip 46 is attached to handle 42. Rotation of handle 42 rotates handle gear 40 to rotate trigger gear 79 when engaging gear trigger 74 is released such that trigger gear 79 engages disc gear 38 and spool gear 37 for rotating spool 31. Also configured into handle gear 40, disc gear 38, trigger gear 79 and spool gear 37 is a drag-system that allows the fish to release line from spool 31 at an adjustable pressure by the use of anti-reverse gear 80, drag washers 83, drag pressure nut 81, and anti-reverse catch lever 82.

Sled locking device 58 comprises two spool sleds 51, 52, sled tabs 57 and sled prongs 29. Sled prongs 29 of spool sleds 51, 52 engage spring loaded spool support band 60 for locking and unlocking the rotation of spool assembly 30 within spool support system 15. Each of spool sleds 51, 52 are received in sled guides 53. Sled guides 53 are received under sled guide caps 54. Sled guide caps 54 are attached to spools discs 32, 33. Sled springs 55 are positioned on protrusion 56 on spool sleds 51, 52. Sled springs 55 are positioned perpendicular to threaded spool rod 35. Spool sleds 51, 52 are spring-loaded using sled springs 55 from a center point on spool discs 31, 32.

Sled tabs 57 are coupled perpendicularly to spool sleds 51, 52, as shown in FIG. 1. Sled locking device 58 is positioned in slot 501 of sled tabs 57. Sled locking device 58 can be coupled to sled tabs 57 with sled locking device prongs 59.

During operation, spool sleds 51, 52 can be moved towards one another for releasing sled prongs 29 from spool support bands 61, 62. Sled tabs 57 can be manipulated to engage sled locking device 58 for retaining spool sleds 51 or 52 adjacent to one another in a released position from spool support bands 61, 62. Spool support bands 61 or 62 can then be rotated against its own support band springs 69 on pivot prongs 22. The movement of opposite spool support bands 61 or 62 is inhibited by support band prongs 502, which are received by limiting slots 503 for limiting the rotation of each spool support band 61 or 62 to 90 degrees.

Left side spool support band 61 and right side spool support band 62 are attached at two common pivotal points 63, 64 and move independently of each other. Each of left side spool support band 61 and right side spool support band 62 can be turned 90 degrees in the direction of the opposing spool support band. When one spool support band 61 or 62 is rotated 90 degrees toward the other spool support band 61 or 62 it loads against spool support band spring 64 and locks into place by spring loaded trigger locking device 73. Spool sled 51 slides towards and away from left side spool support 61 to engage and disengage left side spool support 61. Spool sled 52 slides towards and away from right side spool support 62 to engage and disengage right side spool support 62. When one spool support bands 61 or 62 is rotated 90 degrees toward the other spool support band 61 or 62 it loads against spool support band spring 69 and locks into place by spring loaded trigger locking device 73. Left side spool support band 61 and right side spool support band 62 incorporate receptacle holes 66 to allow for the engagement and the disengagement of sled prongs 29 on spool sleds 51, 52.

On the outside of spool support system 15 is trigger system 70 which is used for unlocking either left side spool support band 61 or right side spool support band 62 at the 90 degree point and allowing the respective left side spool support band 61 or right side spool support band 62 to return to an inline position. Trigger system 70 also allows for the engaging and disengaging of trigger gear 79. Trigger system 70 comprises spool support band lock spring 72 which engages spring loaded trigger locking device 73. Spring loaded trigger locking device 73 is used for locking and unlocking the rotation of support bands 61, 62 at the 90 degree point. Spool support band lock spring 72 holds forward pressure against spring loaded spool support band 60 until reverse pressure is applied by the caster to release spring loaded spool support band 60 to the in-line position. Engaging gear trigger 74 is received in engaging gear trigger guide 75. Engaging trigger spring 76 is positioned in between engaging gear trigger 74 and spring stop 77. The caster's finger is used for engaging gear trigger 74 to disengage trigger gear 79. Thereafter, spring loaded trigger locking device 73 is activated to release spring loaded trigger locking device 73 and thereby unlock spring loaded spool support band 60. Line 505 is attached to spool 31.

During operation, fishing reel 10 can be cast in the in-line position, as shown in FIG. 1. In this position, prongs 29 of spool sleds 51, 52 are engaged with spring loaded spool support band 60. For a right side cast, shown in FIG. 4, prongs 29 of spool sleds 52 are released from right side spool support band 62 in direction of arrow $A_1$ and spool assembly 30 is rotated 90 degrees.

During the right side cast, spool sleds 52 are disengaged from right side spool support band 62 and left side spool support band 61 rotates 90 degrees to right side spool support band 62. Sled tabs 57 can be manipulated to engage sled locking device 58 for retaining spool sleds 52 adjacent to one another in a released position from right side spool support band 62. After rotation of spool assembly 30, spring loaded trigger locking device 73 can lock left side spool support band 61 in place. This position can be referred to as the 90 degree positive twist position of the first cast. To release the right side cast position, engaging gear trigger 74 is activated to disengage trigger gear 79. Thereafter, spring loaded trigger locking device 73 is activated to release spring loaded trigger locking device 73 and thereby unlock left side spool support band 61 to return left side spool support band 61 to a position at 180 degrees and rotate spool assembly 30 back to the in-line casting position, as shown in FIG. 1. Release of left side spool support band 61 by spring loaded trigger locking device 73 releases sled locking device 58 for releasing spool sleds 52 from sled tabs 57 when sled locking device 58 comes in contact with right side support band 62. Upon release of sled locking device 58, spool sleds 52 are biased by sled springs 55 such that prongs 29 engage right side spool support band 62 in support band holes 66.

Figure 5:
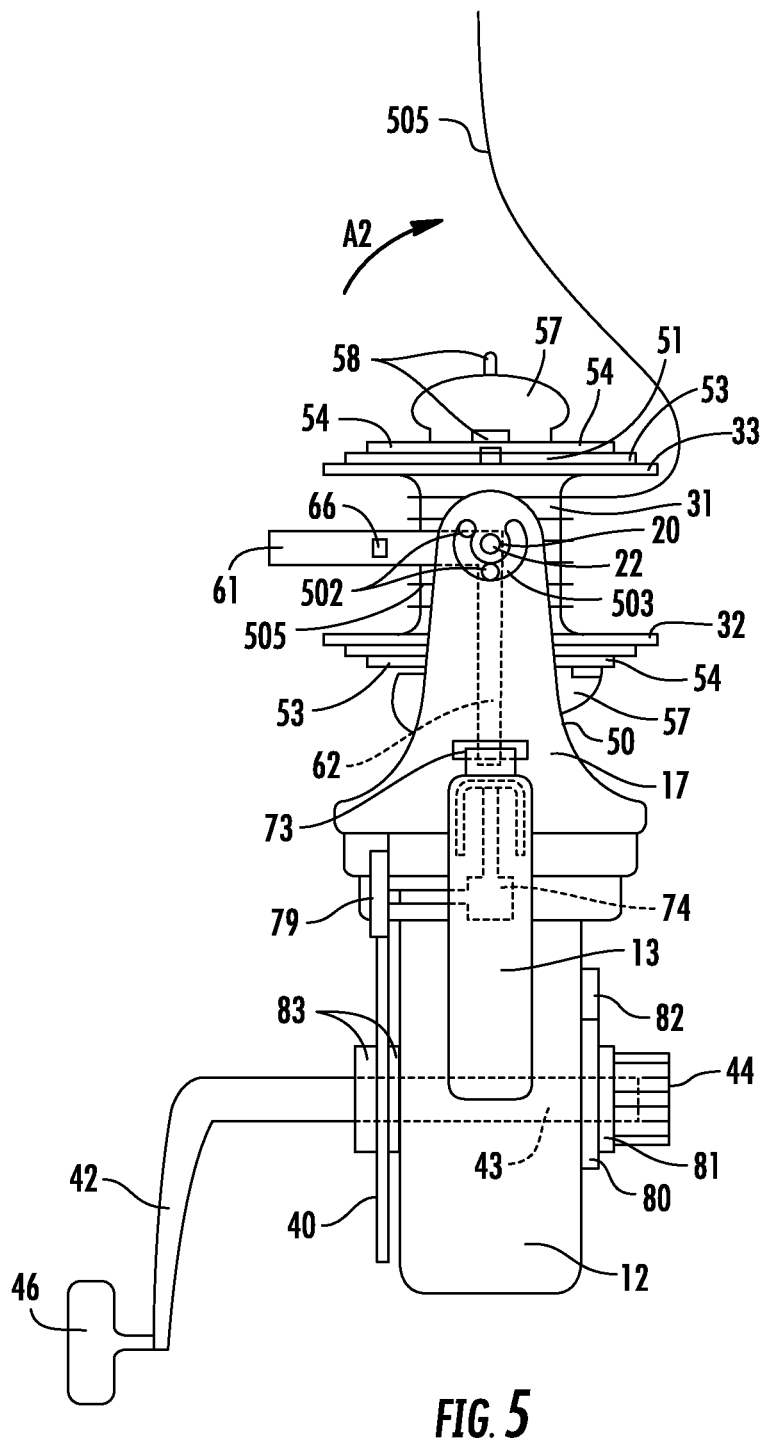
FIG. 5 is a top view of the fishing reel of the present invention showing the spool in the left side cast position.

For a left side cast shown in FIG. 5, prongs 29 of spool sleds 51 are released from left side spool support band 61 and right side band 62 is rotated 90 degrees in the direction of arrow $A_2$. FIG. 5 illustrates the rotation of spool assembly 30 for a left side cast. During the left side cast, spool sleds 51 are disengaged from left side spool support band 61 and right side spool support band 62 rotates 90 degrees to left side spool support band 61. Sled tabs 57 can be manipulated to engage sled locking device 58 for retaining spool sleds 51 adjacent to one another in a released position from left side spool support band 61. After rotation of spool assembly 30, spring loaded trigger locking device 73 can lock right side spool support band 62 in place. This position can be referred to as the 90 degree negative twist position of the second cast. To release the left side cast position, engaging gear trigger 74 is activated to disengage trigger gear 79. Thereafter, spring loaded trigger locking device 73 is activated to release spring loaded trigger locking device 73 and thereby unlock right side spool support band 62 to return right side support band 62 to a position at 180 degrees and rotate spool assembly 30 back to the in-line casting position, as shown in FIG. 1. Release of right side spool support band 62 also releases sled locking device 58 when sled locking device 58 comes in contact with left side spool support 61 for releasing spool sleds 51 from sled locking device 58. Upon release of sled locking device 58, spool sleds 51 are biased by sled springs 55 such that prongs 29 engage respective left side spool support band 61 in support band holes 66.

Figure 4:
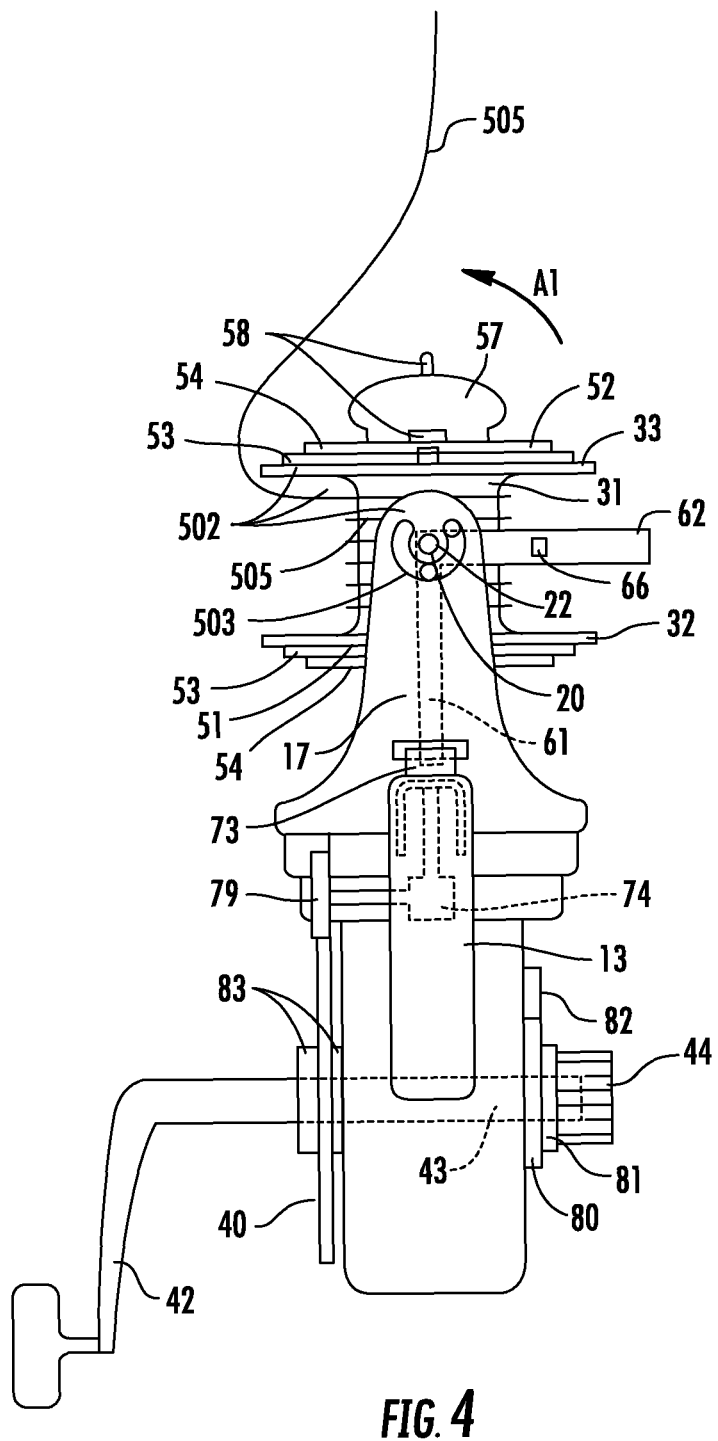
FIG. 4 is a top view of the fishing reel of the present invention showing the spool in the right side cast position.

Fishing reel 10 can be used in a method for casting line 505 from spool 31 in a first position, as shown in FIG. 4 or 5, rotating spool 31 to a second position, the second position being rotated 90 degrees or 180 degrees from the first position, and casting line 505 with spool 31 in the second position.

Fishing reel 10 can be used in a method for casting line 505 from spool 31 in a first position that generates positive twist by the cast or retrieve, as shown in FIGS. 4 and 5, rotating spool 31 to a second position, the second position being rotated 180 degrees from the first position, and casting line 505 with spool 31 in the second position that generates negative twist in order to maintain a neutral zero twist of line 505.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A fishing reel comprising:
   a spool support system for pivotally supporting a spool assembly; and
   a spring loaded locking device engaged with said spool assembly for locking and unlocking the spool assembly from the spool support system;
   said spool support system comprises a brace, said brace comprising a pair of brace arm members, said brace arm members being coupled or integral to one another, said spring loaded locking device comprising spring loaded spool support bands, spool sleds and a sled locking device, each of said brace arm members including a pivot point aperture for receiving respective pivot prongs of said spring loaded spool support bands that can be rotated 90 degrees by disengaging said spool sleds from said spring loaded spool support bands and locking said spool sleds with said sled locking device,
   wherein said spool assembly can be locked and unlocked from said spool support system using said spring loaded locking device and said spool assembly can be rotated 90 degrees in either direction thereby allowing the spool assembly to be cast in a 0 degree in-line position, a 90 degree right cast position or a 90 degree left cast position.

2. The fishing reel of claim 1 wherein said spring loaded spool support bands comprise a left side spool support band and a right side spool support band attached at common pivotal points, said left side spool support band and said right side spool support band being independently rotatable to 90 degrees from one another.

3. The fishing reel of claim 2 further comprising a trigger system used for unlocking either said left side spool support band or said right side spool support band at the 90 degree point and allowing the respective left side spool support band or right side spool support band to return to an in-line position.

4. The fishing reel of claim 3 wherein when one of said spring loaded spool support bands is rotated 90 degrees toward the other said spring loaded spool support bands it loads against a spool support band spring and locks into place by a spring loaded trigger locking device of said trigger system.

5. The fishing reel of claim 4 wherein said trigger system comprises a spool support band lock spring that engages said spring loaded trigger locking device, said spool support band lock spring holds forward pressure against said spring loaded spool support bands until reverse pressure is applied by a caster to release said spring loaded spool support bands to the in-line position.

6. The fishing reel of claim 5 further comprising a spool gear received on a spool disc bushing positioned around said threaded spool rod, a disc gear engaging said spool gear, and a handle gear engaging a trigger gear, said handle gear cooperating with a handle, wherein rotation of said handle rotates said handle gear to rotate said trigger gear when a trigger is released such that said trigger gear engages said disc gear and said spool gear.

7. The fishing reel of claim 1 wherein said spool assembly comprises a spool and a pair of spool discs coupled to each side of said spool, a pair of said sleds are received in sled guides attached to each of said pair of said spool discs, a threaded spool axis rod extends laterally through said spool and said pair of spool discs, said pair of sleds are biased perpendicular to either side of said threaded spool axis.

8. The fishing reel of claim 7 wherein said sled locking device engages a notch of a sled lock tab for retaining said pair of biased spool sleds adjacent one another in a released position from said spring loaded spool support bands.

9. A method of casting a line comprising:
   casting the line from a spool in a first position;
   rotating said spool to a second position, said second position being rotated 90 degrees or 180 degrees from said first position; and
   casting the line with said spool in said second position,
   wherein said spool is part of a spool assembly supported in a spool support system and a spring loaded locking device is engaged with said spool assembly for locking and unlocking the spool assembly from the spool support system, said spool assembly can be locked and unlocked from said spool support system using said spring loaded locking device,
   said spool support system comprises a brace, said brace comprising a pair of brace arm members, said brace arm members being coupled or integral to one another, said spring loaded locking device comprising spring loaded spool support bands, spool sleds and a sled locking device, each of said brace arm members including a pivot point aperture for receiving respective pivot prongs of said spring loaded spool support bands that can be rotated 90 degrees by disengaging said spool sleds from said spring loaded spool support bands and locking said spool sleds with said sled locking device and said spool assembly can be rotated 90 degrees in either direction thereby allowing the spool assembly to be cast in a 0 degree in-line position, a 90 degree right cast position or a 90 degree left cast position.

10. The method of claim 9 wherein said spring loaded spool support bands comprise a left side spool support band and a right side spool support band attached at common pivotal points, said left side spool support band and said right side spool support band being independently rotatable to 90 degrees from one another; and a trigger system is used for unlocking either said left side spool support band or said right side spool support band at the 90 degree point and allowing the respective left side spool support band or right side spool support band to return to an in-line position.

11. The method of claim 10 wherein when one of said spring loaded spool support bands is rotated 90 degrees toward the other said spring loaded spool support bands it loads against a spool support band spring and locks into place by a spring loaded trigger locking device of said trigger system.

12. The method of claim 11 wherein said trigger system comprises a spool support band lock spring that engages said spring loaded trigger locking device, said spool support band lock spring holds forward pressure against said spring loaded spool support bands until reverse pressure is applied by a caster to release said spring loaded spool support bands to the in-line position.

13. A method of casting a line comprising:

casting the line from a spool in a first position that generates positive twist by the cast or retrieve;

rotating said spool to a second position, said second position being rotated 180 degrees from said first position; and casting the line with said spool in said second position that generates negative twist in order to maintain a neutral zero twist of the line, wherein said spool is part of a spool assembly supported in a spool support system and a spring loaded locking device is engaged with said spool assembly for locking and unlocking the spool assembly from the spool support system, said spool support system comprises a brace, said brace comprising a pair of brace arm members, said brace arm members being coupled or integral to one another, said spring loaded locking device comprising spring loaded spool support bands, spool sleds and a sled locking device, each of said brace arm members including a pivot point aperture for receiving respective pivot prongs of said spring loaded spool support bands that can be rotated 90 degrees by disengaging said spool sleds from said spring loaded spool support bands and locking said spool sleds with said sled locking device wherein said spool assembly can be locked and unlocked from said spool support system using said spring loaded locking device and said spool assembly can be rotated 90 degrees in either direction thereby allowing the spool assembly to be cast in a 0 degree in-line position, a 90 degree right cast position or a 90 degree left cast position.

14. The method of claim 13 wherein said spring loaded spool support bands comprise a left side spool support band and a right side spool support band attached at common pivotal points, said left side spool support band and said right side spool support band being independently rotatable to 90 degrees from one another and a trigger system is used for unlocking either said left side spool support band or said right side spool support band at the 90 degree point and allowing the respective left side spool support band or right side spool support band to return to an in-line position.

15. The method of claim 14 wherein when one of said spring loaded spool support bands is rotated 90 degrees toward the other said spring loaded spool support bands it loads against a spool support band spring and locks into place by a spring loaded trigger locking device of said trigger system; and wherein said trigger system comprises a spool support band lock spring that engages said spring loaded trigger locking device, said spool support band lock spring holds forward pressure against said spring loaded spool support bands until reverse pressure is applied by a caster to release said spring loaded spool support bands to the in-line position.

* * * * *